United States Patent Office 3,848,020
Patented Nov. 12, 1974

3,848,020
PROCESS FOR PRODUCING HOMO- AND COPOLYMERS OF CYCLIC ACETALS
Karlheinz Burg, Langenhain, Taunus, and Helmut Schlaf, Kelkheim, Taunus, Germany, assignors to Farbwerke Hoechst Aktiengesellschaft vormals Meister Lucius & Bruning, Frankfurt am Main, Germany
No Drawing. Filed Aug. 17, 1972, Ser. No. 281,559
Claims priority, application Germany, Aug. 19, 1971, P 21 41 600.2
Int. Cl. C08g 1/04, 1/20
U.S. Cl. 260—823     5 Claims

ABSTRACT OF THE DISCLOSURE

Homo- or copolymers of cyclic acetals, especially trioxane and dioxolane, are produced by catalytically initiated polymerisation of one or more monomers. As initiators anhydrous perfluoro-alkyl sulfonic acids are used, which are dissolved in inert organic solvents. The products are thermoplastic and are suitable for producing molded articles, especially injection molded articles.

---

The present invention relates to a process for producing homo- and copolymers of cyclic acetals.

It is known that the homo- and copolymerisation of cyclic oligomers of formaldehyde, for example of trioxane or tetroxane, and of cyclic acetals or ketals, for example of 1,3-dioxolane or 2,2-dimethyl-1,3-dioxolane, can be initiated by protonic acids, Lewis acids and cation-forming oxonium compounds. These initiators are distinguished not only in their activity initiating the polymerisation, but influence to a large extent the breaking up and transfer reactions taking place as well as the growth reaction. An extraordinarily effective initiator is anhydrous perchloric acid which gives polymers with high molecular weights and high yields even with very low initiator concentrations.

It is also known that the copolymerisation of trioxane can be carried out to special advantage in the melt. The uniform distribution of the initiator in the monomer mixture presents difficulties, since the polymerisation with especially high active initiators, for example anhydrous perchloric acid, sets in almost immediately. The process is carried out, therefore, in the known way so that the anhydrous perchloric acid is dissolved in a suitable solvent and this solution is used for the initiation of the polymerisation.

The decisive disadvantage, when working with anhydrous perchloric acid is, however, that a highly explosive compound is concerned, the handling of which is extremely difficult.

The present invention provides a process for producing homo- or copolymers of cyclic acetals at temperatures of between the melting point and boiling point of the monomer mixture in the presence of a protonic acid, wherein a solution of an anhydrous perfluoroalkyl-sulfonic acid with 1 to 18 carbon atoms is used as protonic acid.

More particularly, the present invention provides a process for the preparation of homo-polymers of trioxane or cyclic acetals and also for the preparation of copolymers of trioxane with one or more cyclic or linear acetals which differ from trioxane, optionally together with a bifunctional cyclic acetal, or with a homo- or copolymer of cyclic ethers with terminal hydroxyl groups at temperatures of between the melting point and boiling point of the monomer mixtures in the presence of a protonic acid wherein a solution of an anhydrous perfluoroalkyl-sulfonic acid with 1 to 18, preferably 1 to 4 carbon atoms is used as protonic acid.

By the term perfluoroalkyl-sulfonic acids compounds of the formula $F_3C-(CF_2)_n-SO_3H$ are understood in which $n$ stands for a whole number from zero to 17, preferably zero to 3, for example trifluoromethyl-sulfonic acid, pentafluoroethyl-sulfonic acid, heptafluoropropyl-sulfonic acid, nonafluorobutyl-sulfonic acid, undecafluoropentyl-sulfonic acid and perfluoroheptyl-sulfonic acid.

As solvent for the perfluoroalkylsulfonic acids used organic solvents not participating in the polymerisation such as linear or cyclic ethers, for example ethylene glycol dimethyl ether, diethylene glycol dimethylether, 1,4-dioxane or tetrahydrofurane, and also aliphatic or aromatic nitro compounds, for example nitro methane or nitro benzene, are used. 1,4-dioxane and nitro methane are especially well suited.

The solvents used must be highly pure, anhydrous and alkali free. The proportion of anhydrous perfluoroalkyl sulfonic acid to organic solvent is 1:100 to 1:50,000, preferably 1:1000 to 1:10,000.

When using the initiator system according to the invention a control of the molecular weight can be carried out with the known compounds with transfer action, for example water, methanol or methylal.

In the process according to the invention the quantity of perfluoroalkyl-sulfonic acid is in the range of from $1.5 \cdot 10^{-7}$ to $1.5 \cdot 10^1$, preferably $1.5 \cdot 10^{-6}$ to $1.5 \cdot 10^{-4}$ mole percent calculated on the amount of monomers to be polymerised, the optimal initiator quantity depending decisively on the type and quantity of the comonomers used.

The co-components are used in a quantity of from 0.0 to 100.0, preferably 0.5 to 30 percent by weight, calculated on the total mixture, of one or more cyclic acetals differing from trioxane, or 0.01 to 90.90, preferably 10 to 60 percent by weight of one or more cyclic acetals differing from trioxane, and 0.01 to 5, preferably 0.1 to 1 percent by weight, in each case calculated on the total mixture, of a bifunctional cyclic acetal, or 0.01 to 99.89, preferably 10 to 60 percent by weight of one or more cyclic acetals and 0.1 to 30, preferably 1 to 10 percent by weight, in each case calculated in the total mixture, of a homo- or copolymer of a cyclic ether.

As comonomers for trioxane cyclic acetals of the formula (I)

(I) 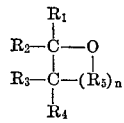

are especially suitable in which $R_1$ to $R_4$ are the same or different and represent hydrogen atoms or alkyl groups which can be halogen-substituted, and $R_5$ stands for an oxymethylene radical which can be substituted by an alkyl group or by an halogen-substituted alkyl group, $n$ being a whole number from 1 to 3, or the radical $-(O-CH_2-CH_2)_m-OCH_2-$, $n$ being 1 and $m$ being a whole number from 1 to 3. The above named alkyl groups contain 1 to 5, preferably 1 or 2 carbon atoms and can be substituted with 1, 2 or 3 halogen atoms, preferably chlorine atoms.

Cyclic formals with 5 to 8 ring members, for example glycol formal (1,3-dioxolane), diglycol formal (1,3,6-trioxocane) and 1,4-butane diformal (1,3-dioxepane) are especially suitable.

In the process according to the invention also linear formals of α, ω-diols, preferably those with 4 to 6 carbon atoms, can be used as comonomers for trioxane, for example bis(4-hydroxy-butoxy) - methane, bis(4-hydroxy-2-butenyloxy) - methane and bis(6-hydroxy-hexoxy)-methane.

The initiator system described is also suitable for the production of terpolymers of trioxane. Besides the cyclic and linear acetals named as comonomers bifunctional cyclic acetals, for example bis(alkanetriol)-triformals, are used as tercomponents, which in the known way alter the flowing properties of the product obtained by formation of branching or cross-linking sites.

By the term bis(alkanetriol)-triformals compounds with one linear and two cyclic formal groups are understood, especially compounds of the formula (II)

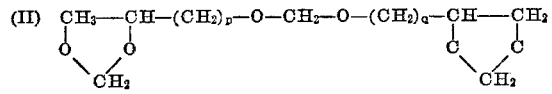

in which $p$ and $q$ each signify a whole number from 3 to 9, preferably 3 or 4. Above all symmetrical bis(alkanetriol)-triformals of the above-named formula are suitable in which $p$ and $q$ are equal, for example bis(1,2,5-pentanetriol)-triformal and preferably bis(1,2,6-hexanetriol)-triformal.

As polyfunctional compounds, for the preparation of the branched or cross-linked polyoxymethylenes according to the invention oligomeric formals can also be used, which are obtained by reaction of 1 mole of a 1,2,(5–11)-triol with 0 to 1 mole of an α,ω-diol having a molecular weight of 62 to 1,000, 0 to 1 mole of a monohydric alcohol having 1 to 11 carbon atoms, and 1 mole formaldehyde for each 2 moles of hydroxyl groups of the reaction mixture (cf. German Pat. 1,238,889).

Besides the comonomers mentioned homo- or copolymers of cyclic ethers with terminal hydroxyl groups can be used as tercomponents. By homo- or copolymers of cyclic ethers polyethylene oxides having a molecular weight in the range of from 300 to 50,000, preferably of 2,000 to 25,000 are understood, whereby most favourable results are obtained in the range of from 4,000 to 10,000, furthermore polyethers of one or more cyclic ethers, for example tetrahydrofurane or 3,3-bis(chloromethyl)-oxetane with molecular weights of over 500, preferably between 5,000 and 100,000.

The polymerisation in the melt takes place advantageously between the melting point of the monomer mixture and the boiling point of the lowest boiling comonomer. Very good results are obtained in the temperature range of between 50 and 70° C.

The polymerisation is carried out in the following way. The solution of anhydrous perfluoroalkylsulfonic acid in an aliphatic linear or cyclic ether or an aliphatic or aromatic nitro compound is added to the monomer mixture and mixed in well. The catalyst quantity is chosen according to type and quantity of the monomers used so that the polymerisation heat set free can be well dissipated.

After ending of the polymerisation, the resulting polymer block is ground and the portion that is unstable in the alkaline medium decomposed in the usual way at an elevated temperature. This can be carried out, for example in benzyl alcohol at 150° C. in the presence of triethanolamine.

Anhydrous perfluoroalkylsulfonic acids are, in contrast to anhydrous perchloric acid, not explosive and in this respect can be handled without special precautions. They yield, however, in the same way the high conversions and molecular weights usual when using perchloric acid.

The homo- and copolymers of trioxane obtained according to the invention have molecular weights (viscosity average) of between 10,000 and 100,000 depending on the initiator and regulator quantity used. In comparison to the initiation with Lewis acids, for example borontrifluoride or boron trifluoride etherate, the polymerisation with perfluoroalkylsulfonic acid in the above mentioned organic solvents as initiator leads to products with higher molecular weights.

The products produced according to the process of the invention are moldable thermoplastically and can be manufactured to sheets, films, strips and injection molded pieces. The products are suitable especially as technical material for manufacturing machine parts, for example casings, gear wheels and control elements.

The following examples illustrate the invention.

Examples 1 to 12

Varying quantities of a solution of 1 part by volume of anhydrous perfluoroalkyl sulfonic acid in 10,000 volume parts of nitromethane or 1,4-dioxane are added in a nitrogen atmosphere to a monomer mixture, heated at 70° C., of 100 or less parts by weight of trioxane and 100 or less parts by weight of 1,3-dioxolane and, optionally 30 or less parts by weight propandiolformal, hexanediolformal, polyethylene oxide or a copolymer of tetrahydrofurane and 3,3-bis(chloromethyl)-oxetane, while mixing intensively. The monomer mixture contains optionally methanol or water as a chain transfer agent. After less than 1 minute the mixture is polymerised to a solid block. It is kept at 70° C. for 30 minutes, the polymer block is chilled in ice water, is ground and the polymer powder obtained is dissolved, while stirring at 150° C., in 1 liter of benzyl alcohol which contains 1 percent by weight of triethanolamine. After 30 minutes at 150° C. the solution is cooled to 80° C., mixed with approximately 700 ccm. methanol and filtered with suction after cooling to room temperature. After extracting by boiling three times with methanol products are obtained the properties of which are listed in Examples 1 to 12 of the following table.

Comparison Example I $0.59 \cdot 10^{-3}$ millimoles per 100 g. monomer mixture of a solution of 1 part by volume of 70% aqueous perchloric acid in 10,000 parts by volume 1,4-dioxane are added in a nitrogen atmosphere to a monomer mixture, heated at 70° C., of 90 parts by weight trioxane and 10 parts by weight 1,3 dioxolane while mixing thoroughly. The mixture is kept at 70° C. for 30 minutes, the polymer block is chilled in ice water, ground and the polymer powder obtained is dissolved, while stirring at 150° C., in 1 liter of benzyl alcohol, which contains 1 percent by weight triethanolamine. After 30 minutes at 150° C. the solution is cooled to 80° C., mixed with approximately 700 ccm. methanol and filtered off with suction after cooling to room temperature. After extracting by boiling three times with methanol a product is obtained the properties of which are given in the following table under I.

To the table:
TO=trioxane
DO=1,3-dioxolane
HDF=1,6-hexane diol formal
PDF=1,2-propandiolformal
PEO 10,000=polyethylene oxide having a molecular weight of 10,000
PTHF/POX 80:20=copolymer of 80 percent by weight tetrahydrofurane and 20 percent by weight 3,3-bis(chloro methyl)-oxetane

| Example number | Monomers (percent) | 10⁻³ mMoles per 100 g. monomer mixture | | | Yield (percent) | RSV-value (dl./g.)* | Melting point (° C.) |
|---|---|---|---|---|---|---|---|
| | | $F_3C(CF_2)_nSO_3H$ | Regulator | Solvent | | | |
| I | 90 TO / 10 DO | 0.59 | $HClO_4$ | 1,4-dioxane | 95 | 0.90 | 154 |
| 1 | 100 TO | 0.23 $n=0$ | | do | 98 | 1.16 | 156 |
| 2 | 100 DO | 23 $n=0$ | | do | 81 | 0.83 | 61 |
| 3 | 97 TO / 3 DO | 0.46 $n=0$ | 2,000 $H_2O$ | Nitromethane | 92 | 0.48 | 155 |
| 4 | 97 TO / 3 DO | 0.23 $n=3$ | | 1,4-dioxane | 95 | 1.10 | 156 |
| 5 | 97 TO / 3 DO | 0.23 $n=3$ | 1,230 $CH_3OH$ | do | 97 | 0.52 | 156 |
| 6 | 90 TO / 10 DO | 0.23 $n=0$ | | Nitromethane | 92 | | 154 |
| 7 | 80 TO / 20 DO | 0.46 $n=7$ | | 1,4-dioxane | 91 | | 150 |
| 8 | 70 TO / 30 DO | 0.92 $n=0$ | | Nitromethane | 91 | | 14₁ |
| 9 | 70 TO / 15 DO / 15 PDF | 1.15 $n=0$ | | do | 86 | 0.61 | 136 |
| 10 | 55 TO / 35 DO / 10 LHDF | 2.26 $n=0$ | | 1,4-dioxane | 92 | 0.73 | 70 |
| 11 | 80 TO / 15 PEO 10,000 / 5 DO | 405 $n=0$ | | do | 85 | 0.39 | 162 |
| 12 | 80 TO / 15 PTHF/POX 80:20 / 5 DO | 334 $n=3$ | | Nitromethane | 80 | 0.32 | 161 |

*Measured in butyrolactone with 2% diphenylamine at 140° C. in a concentration of 0.5 g./100 ml.

What is claimed is:

1. In a process for producing moldable homopolymers of trioxane or copolymers comprising a major amount of units derived from trioxane and a minor amount of units derived from a linear acetal of an α,ω-diol or a cyclic acetal of the formula

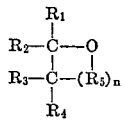

wherein $R_1$, $R_2$, $R_3$ and $R_4$ may be the same or different represent hydrogen or an alkyl group which can be halogen-substituted, $R_5$ represents an oxymethylene radical which can be substituted by an alkyl or halogen-substituted alkyl group, and $n$ is 1 to 3, or when $n$ is 1, $R_5$ can be the radical —$(O-CH_2CH_2)_m-OCH_2$— wherein $m$ is 1 to 3, at a temperature between the melting point and boiling point of the monomer or monomer mixture in the presence of a protonic acid, the improvement which consists in using an anhydrous perfluoroalkyl sulfonic acid with 1 to 18 carbon atoms as the protonic acid.

2. In a process for producing a moldable copolymer of a major amount of trioxane and a minor amount of a cyclic acetal of the formula

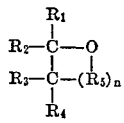

wherein $R_1$, $R_2$, $R_3$ and $R_4$ may be the same or different and represent hydrogen or an alkyl group which can be halogen-substituted, $R_5$ represents an oxymethylene radical which can be substituted by an alkyl or halogen-substituted alkyl group, and $n$ is 1 to 3, or when $n$ is 1, $R_5$ can be the radical —$(O-CH_2CH_2)_m-OCH_2$— wherein $m$ is 1 to 3, at a temperature between the melting point and boiling point of the monomer or monomer mixture in the presence of a protonic acid, the improvement which consists in using an anhydrous perfluoroalkyl sulfonic acid with 1 to 18 carbon atoms as the protonic acid.

3. A process according to claim 2 wherein the anhydrous perfluoroalkyl sulfonic acid is used in the form of a solution in an inert organic solvent.

4. In a process for producing a moldable copolymer of a major amount of trioxane and a minor amount of 1,3-dioxolane at a temperature of 50° to 70° C. in the presence of a protonic acid, the improvement which consists in using an anhydrous perfluoroalkyl sulfonic acid with 1 to 18 carbon atoms as the protonic acid.

5. A process according to claim 4 wherein the perfluoroalkyl sulfonic acid contains from 1 to 4 carbon atoms.

References Cited
UNITED STATES PATENTS 3,297,642  1/1967  Richtzenhain et al. __ 260—67 FP
3,394,107  7/1968  Wakasa et al. _____ 260—67 FP LUCILLE M. PHYNES, Primary Examiner U.S. Cl. X.R.

260—2 RXA, 67 FP